(12) United States Patent
Lee et al.

(10) Patent No.: US 10,143,974 B2
(45) Date of Patent: Dec. 4, 2018

(54) FORWARD OSMOSIS-BASED SEPARATION MEMBRANE BASED ON MULTILAYER THIN FILM, USING CROSSLINKING BETWEEN ORGANIC MONOMERS, AND PREPARATION METHOD THEREFOR

(71) Applicant: KOREA INSTITUTE OF SCIENCE AND TECHNOLOGY, Seoul (KR)

(72) Inventors: Seockheon Lee, Seoul (KR); Soon Bum Kwon, Seoul (KR); Jung-Hyun Lee, Seoul (KR); Jong Suk Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 330 days.

(21) Appl. No.: 15/119,305

(22) PCT Filed: Feb. 19, 2014

(86) PCT No.: PCT/KR2014/001326
§ 371 (c)(1),
(2) Date: Oct. 29, 2016

(87) PCT Pub. No.: WO2015/122555
PCT Pub. Date: Aug. 20, 2015

(65) Prior Publication Data
US 2017/0056838 A1 Mar. 2, 2017

(30) Foreign Application Priority Data
Feb. 17, 2014 (KR) ........................ 10-2014-0018033

(51) Int. Cl.
*B01D 69/10* (2006.01)
*B01D 69/12* (2006.01)
(Continued)

(52) U.S. Cl.
CPC ......... *B01D 69/125* (2013.01); *B01D 61/002* (2013.01); *B01D 67/0013* (2013.01);
(Continued)

(58) Field of Classification Search
None
See application file for complete search history.

(56) References Cited

U.S. PATENT DOCUMENTS

| | | |
|---|---|---|
| 2007/0212514 A1 | 9/2007 | Huang et al. |
| 2012/0012520 A1 | 1/2012 | Lee et al. |

(Continued)

FOREIGN PATENT DOCUMENTS

| | | |
|---|---|---|
| JP | 2004-352568 A | 12/2004 |
| KR | 10-0990168 B1 | 10/2010 |

(Continued)

OTHER PUBLICATIONS

Ngai Yin Yip et al. High Performance Thin-Film Composite Forward Osmosis Membrane, Environmental Science & Technology, Apr. 21, 2010, pp. 3812-3818, vol. 44, No. 10.

(Continued)

*Primary Examiner* — Chester T Barry
(74) *Attorney, Agent, or Firm* — Goldilocks Zone IP Law (57) ABSTRACT

The present invention relates to a forward osmosis-based separation membrane based on a multilayer thin film, using crosslinking between organic monomers, and a preparation method therefore, and in the preparation of the forward osmosis-based separation membrane including a support layer and a selective layer, a middle layer is provided between the support layer and the selective layer so as to prevent a phenomenon in which the selective layer is filled in a pore of the support layer, such that the thickness of a multilayer thin film constituting the selective layer is optimized, and excellent water permeability, salt removal rate (Continued)

and pollution resistance properties are exhibited through the support layer having a structure of uniform surface pores and minimized pore distortion.

20 Claims, 4 Drawing Sheets

(51) Int. Cl.
*B01D 61/00* (2006.01)
*B01D 67/00* (2006.01)
*B01D 69/02* (2006.01)
*B01D 71/40* (2006.01)
*B01D 71/42* (2006.01)
*B01D 71/52* (2006.01)
*B01D 71/56* (2006.01)

(52) U.S. Cl.
CPC ......... *B01D 67/0093* (2013.01); *B01D 69/02* (2013.01); *B01D 69/10* (2013.01); *B01D 69/105* (2013.01); *B01D 69/12* (2013.01); *B01D 71/40* (2013.01); *B01D 71/42* (2013.01); *B01D 71/52* (2013.01); *B01D 71/56* (2013.01); *B01D 2323/08* (2013.01); *B01D 2323/30* (2013.01); *B01D 2323/345* (2013.01); *B01D 2325/36* (2013.01)

(56) References Cited

U.S. PATENT DOCUMENTS

| | | | |
|---|---|---|---|
| 2012/0043274 A1 | 2/2012 | Chi et al. | |
| 2013/0287945 A1 | 10/2013 | Roy et al. | |
| 2015/0274891 A1* | 10/2015 | Konradi | B01D 65/08 |
| | | | 210/500.32 |

FOREIGN PATENT DOCUMENTS

| | | |
|---|---|---|
| KR | 10-1076221 B1 | 10/2011 |
| KR | 10-2011-0121061 A | 11/2011 |
| KR | 10-2013-0002837 A | 1/2013 |
| KR | 10-2013-0011987 A | 1/2013 |
| KR | 10-2014-0003278 A | 1/2014 |
| KR | 10-2014-0016274 A | 2/2014 |
| KR | 10-2014-0105082 A | 9/2014 |

OTHER PUBLICATIONS

Yue Cui et al. Micro-morphology and formation of layer-by-layer membranes and their performance in osmotically driven processes, Chemical Engineering Science, Jun. 10, 2013, pp. 13-26 vol. 101.
Saren Qi et al. Double-skinned forward osmosis membranes based on layer-by-layer assembly—FO performance and fouling behavior, Journal of Membrane Science, Mar. 8, 2012, pp. 20-29, vol. 405-406.

* cited by examiner

FORWARD OSMOSIS-BASED SEPARATION MEMBRANE BASED ON MULTILAYER THIN FILM, USING CROSSLINKING BETWEEN ORGANIC MONOMERS, AND PREPARATION METHOD THEREFOR

DESCRIPTION OF GOVERNMENT-SUPPORTED RESEARCH AND DEVELOPMENT

This work was supervised by the Korea Institute of Science and Technology and was supported by the Next Generation Eco-innovation Technology Development Project of the Ministry of Environment and Korea Environmental Industry and Technology Institute (Project name: Development of osmosis/distillation membrane-based core technology for advanced sewage and wastewater treatment (2M32570), Project number: 1485011148 (E21341004001100000000000)).

TECHNICAL FIELD

The present disclosure relates to a forward osmosis-based separation membrane based on a multilayer thin film, using crosslinking between organic monomers, and a method for preparing the same.

BACKGROUND ART

A separation membrane process using forward osmosis (FO) is drawing a lot of attentions recently because it is applicable to seawater desalination and water treatment as well as production of sustainable energy using salinity gradient. Separation membrane processes using forward osmosis (FO) include a forward osmosis process, a pressure-retarded osmosis (PRO) process, etc.

In the seawater desalination process, the forward osmosis (FO) process is advantageous over the reverse osmosis (RO) process because it significantly lowers power consumption and cost for production of water because it is operable at relatively very low pressures and membrane washing is easy due to less membrane fouling because it proceeds without a pressurized process. Despite these advantages, it is not commercially available yet due to the absence of a suitable forward osmosis separation membrane.

Low salt flux (reverse salt flux) and high water flux are required for a superior forward osmosis (FO) membrane or pressure-retarded osmosis (PRO) membrane. In order to achieve a forward osmosis membrane and a pressure-retarded osmosis membrane of high performance, it is necessary to optimize the physical and chemical structures of a support (support layer) and a selective layer (active layer). The support should be designed to have high porosity, low pore distortion, high hydrophilicity and small thickness so as to minimize the decrease of water flux due to internal concentration polarization (ICP). And, the selective layer should be designed such that it exhibits high water permeability and low salt permeability.

At present, the most widely used commercially available forward osmosis membrane is the CTA (cellulose triacetate) forward osmosis membrane developed by Hydration Technology Inc. (HTI, USA). HTI's CTA forward osmosis membrane is prepared to a small thickness of about 50 μm in order to minimize the ICP problem. However, the forward osmosis membrane exhibits relatively low water flux due to the inherently low water permeability of the selective layer and the operable pH and temperature ranges are limited due to the properties of the material.

In order to improve these disadvantages of the CTA forward osmosis membrane, researches and developments have been actively carried out on a thin film composite (TFC) separation membrane. The TFC separation membrane is a separation membrane in which a polyamide selective layer is formed on a porous support through interfacial polymerization between organic monomers (Yip et al. *Environmental Science and Technology,* 44, 3812-3818 (2010)). Recently, Oasys began commercialization of the polyamide-based TFC-FO separation membrane. However, the support used in the polyamide-based TFC-FO separation membrane is limited in maximizing water flux because it is mainly prepared from polysulfone (PSF) which has very low hydrophilicity. In addition, the selective layer prepared by interfacial polymerization is limited in terms of water flux improvement because its thickness is relatively larger (~200 nm) due to the characteristics of bulk interfacial polymerization. Also, because the surface of the selective layer is very rough due to the characteristics of interfacial polymerization, the membrane is susceptible to membrane fouling.

In order to improve these problems of interfacial polymerization, a method of preparing the selective layer through multilayer thin film assembly (LbL, layer-by-layer) using a polymer electrolyte has been proposed. The multilayer thin film assembly (LbL) method using a polymer electrolyte is a technique of repeatedly stacking a multilayer thin film in an aqueous solution using electrostatic attraction between the polymer electrolytes (Cui et al. *Chemical Engineering Science,* 101, 1326 (2013)). However, the multilayer thin film assembly (LbL) method using a polymer electrolyte is limited in the physical and chemical structures of the thin film because the stacked material should be water-soluble and, as a result, the water permeability and salt permeability of the separation membrane are unsatisfactory as compared to the commercially available forward osmosis membrane.

Meanwhile, a method of preparing multilayer thin films having various chemical structures through repeated crosslinking between organic monomers has been reported recently. However, optimization (support, organic monomer, solvent, concentration, etc.) of a process for preparing a selective layer with satisfactory salt removal rate, water flux and pollution resistance properties has not been achieved yet. That is to say, optimization of parameters such as the support, organic monomer, solvent, concentration, etc. is required to prepare a high-performance selective layer. In addition, when forming the multilayer thin film through crosslinking between organic monomers, the multilayer thin film needs to be stacked excessively due to the phenomenon of the thin film being filled in the pores of the support (pore filling). This leads to significant decrease in the water permeability of the separation membrane as well as increase in cost.

REFERENCES OF RELATED ART

Patent Documents

Korean Patent Registration No. 10-1076221.

Non-Patent Documents

Yip et al. *Environmental Science and Technology,* 44, 3812-3818 (2010).
Cui et al. *Chemical Engineering Science,* 101, 1326 (2013).
Qi et al. *Journal of Membrane Science,* 405406, 2029 (2012).

DISCLOSURE

Technical Problem

The present disclosure is directed to providing a forward osmosis-based separation membrane based on a multilayer thin film, using crosslinking between organic monomers, and a preparation method therefor. In the preparation of the forward osmosis-based separation membrane including a support and a selective layer, a middle layer is provided between the support and the selective layer so as to prevent a phenomenon in which the selective layer is filled in pores of the support, such that the thickness of a multilayer thin film constituting the selective layer is optimized, and superior water permeability, salt removal rate and pollution resistance properties are exhibited through the support having a structure of uniform surface pores and minimized pore distortion.

Technical Solution

In an aspect, the present disclosure provides a method for preparing a forward osmosis-based separation membrane based on a multilayer thin film, using crosslinking between organic monomers, which includes: a step of forming a support by dipping a polymer solution in which a hydrophilic polymer solute is dissolved into a polymer nonsolvent, thereby performing phase transition of the hydrophilic polymer solute; a step of forming a middle layer on the support; a step of forming a first organic monomer thin film layer which is self-assembled on the middle layer in a molecular scale and forms chemical bonding with the middle layer by preparing a first organic monomer solution in which a first organic monomer is dissolved and dipping the support having the middle layer formed into the first organic monomer solution; and a step of forming a second organic monomer thin film layer which is self-assembled on the first organic monomer thin film layer in a molecular scale and forms crosslinkage with the first organic monomer thin film layer by preparing a second organic monomer solution in which a second organic monomer is dissolved and dipping the support having the first organic monomer thin film layer formed into the second organic monomer solution.

In an exemplary embodiment, the polymer solution in which the hydrophilic polymer solute is dissolved is a polymer solution in which the hydrophilic polymer solute is dissolved in a polymer solvent and the hydrophilic polymer solute is one of polyacrylonitrile (PAN), polyimide, polyetherimide and polyvinyl alcohol. And, the polymer solvent is one of N-methylpyrrolidone (NMP), dimethylacetamide (DMAC) and dimethylformamide (DMF). The hydrophilic polymer solute may be mixed in the polymer solution at a concentration of 14-18 wt % based on the total weight of the polymer solution.

In an exemplary embodiment, the polymer solution may further contain a pore-inducing agent and the pore-inducing agent may be one of 1,3-dioxalane, polyvinylpyrrolidone and acetone or a combination thereof. And, the pore-inducing agent is mixed in the polymer solution at a concentration of 1-5 wt % polymer solution.

In an exemplary embodiment, the step of forming the support includes: a process of preparing a polymer solution in which a hydrophilic polymer solute is dissolved; a process of casting the polymer solution; and a process of forming the support by dipping the cast polymer solution into a polymer nonsolvent, thereby eluting a polymer solvent contained in the cast polymer solution and performing phase transition of the hydrophilic polymer solute to a solid, and the polymer solution is cast on one of a nonwoven fabric, a glass substrate or a woven fabric.

In an exemplary embodiment, before the formation of the middle layer, the support may be put in an aqueous sodium hydroxide (NaOH) solution so as to induce hydrolysis. Also, before the formation of the middle layer, UV and ozone may be irradiated to the surface of the support or the surface of the support may be treated with oxygen plasma.

In an exemplary embodiment, the middle layer may be formed through interfacial polymerization or self-assembly. The middle layer may be formed through interfacial polymerization between a multifunctional amine and a multifunctional chloride. Also, the middle layer may be formed through interfacial polymerization between piperazinamine and trimesoyl chloride (TMC) or interfacial polymerization between piperazinamine and an aliphatic trifuctional chloride. In addition, the middle layer may be formed through self-assembly (LbL) between an anode polymer electrolyte and a cathode polymer electrolyte. The anode polymer electrolyte and the cathode polymer electrolyte have a larger molecular size than pores of the support. The anode polymer electrolyte is one of polyetherimide, polyethylenimine and poly(allylamine hydrochloride) and the cathode polymer electrolyte is poly(acrylic acid).

In an exemplary embodiment, the first organic monomer solution is one in which the first organic monomer is dissolved in a first organic solvent and the second organic monomer solution is one in which the second organic monomer is dissolved in a first organic solvent. The first organic monomer is an aromatic diamine. Specifically, the first organic monomer is one of m-, o- and p-phenylenediamine. The second organic monomer is a multifunctional chloride. Specifically, the second organic monomer is trimesoyl chloride (TMC).

In an exemplary embodiment, the first organic solvent does not dissolve the support and the middle layer but dissolves the first organic monomer and the second organic monomer. The first organic solvent is one of toluene and tetrahydrofuran (THF).

In an exemplary embodiment, before the formation of the second organic monomer thin film layer, a second washing process of washing the support having the first organic monomer thin film layer formed using a first organic solvent may be conducted. And, before the second washing process, a first washing process of washing the support having the first organic monomer thin film layer formed using a second organic solvent may be conducted. The first organic monomer is soluble in the second organic solvent and the second organic solvent is one of acetone, an alcohol, water and tetrahydrofuran (THF). The first organic monomer has a relatively larger solubility in the second organic solvent than in the first organic solvent.

In an exemplary embodiment, the step of forming the first organic monomer thin film layer and the step of forming the second organic monomer thin film layer may be repeated.

The present disclosure also provides a forward osmosis-based separation membrane based on a multilayer thin film, using crosslinking between organic monomers, which includes: a support containing a hydrophilic polymer material; a middle layer in the form of a polymer thin film layer which is provided on the support and blocks pores of the support; a first organic monomer thin film layer which is self-assembled (mLbL) on the middle layer in a molecular scale and forms chemical bonding with the middle layer; and a second organic monomer thin film layer which is self-assembled (mLbL) on the first organic monomer thin film layer in a molecular scale and forms crosslinkage with the first organic monomer thin film layer.

In an exemplary embodiment, the support may have a structure wherein the hydrophilic polymer material is provided in a nonwoven fabric or a woven fabric.

Advantageous Effects

A forward osmosis-based separation membrane based on a multilayer thin film, using crosslinking between organic monomers, and a method for preparing the same according to the present disclosure provide the following effects.

Because a selective layer is formed by alternately stacking a first organic monomer thin film layer and a second organic monomer thin film layer and the first organic monomer thin film layer and the second organic monomer thin film layer form crosslinkage as they are self-assembled (mLbL) in a molecular scale, the thickness of the selective layer can be minimized and the water flux and salt removal properties of the selective layer can be improved. Also, the thickness of the selective layer may be controlled easily with the number of the alternate stacking of the first organic monomer thin film layer and the second organic monomer thin film layer.

In addition, by constituting the support with optimized materials of optimized composition, a uniform surface pore size, high porosity and minimized pore distortion can be achieved.

BEST MODE

The present disclosure relates to a forward osmosis-based separation membrane including a support (support layer) and a selective layer (active layer). The forward osmosis-based separation membrane refers to a forward osmosis membrane using forward osmosis or a pressure-retarded osmosis membrane.

The selective layer is formed in the form of a multilayer thin film by repeated crosslinkage between organic monomers. That is to say, the selective layer has a structure in which a plurality of organic monomers are stacked vertically, with each organic monomer forming one thin film layer, and the organic monomers adjacent in the vertical direction are connected with each other through crosslinkage. The vertically stacked organic monomers are self-assembled (mLbL, molecular layer-by-layer assembled) in a molecular scale and the organic monomer of each thin film layer is self-assembled in a nano-sized molecular scale.

The support has nano-sized pores on the surface thereof and inside thereof. When the selective layer is formed on the support in the form of a multilayer thin film by repeated crosslinkage between organic monomers, some of the organic monomers fill the pores of the support (pore filling) as the organic monomers are self-assembled in a nano-sized molecular scale. Therefore, it is necessary to stack the organic monomers more than required.

To prevent this problem, the present disclosure presents a method of, before stacking the selective layer on the support, forming a middle layer on the support and then forming a selective layer on the middle layer through repeated crosslinkage between organic monomers. Because the selective layer is formed on the middle layer in the state where the surface pores of the support are covered by the middle layer, the thickness of the selective layer can be accurately controlled with the stacking number of the organic monomers. The middle layer may be stacked through interfacial polymerization or self-assembly. In order to ensure that the selective layer covers the surface of the support without being filled in the pores of the support, when the middle layer is formed through self-assembly, the material constituting the self-assembled middle layer has a larger molecular size than the pores of the support.

Meanwhile, in order to improve the water flux of the support, the support should have a uniform surface pore size as well as high porosity of inner pores and pore distortion should be minimized. To satisfy this, the present disclosure presents a polymer solution for preparing the support, which contains optimized materials of optimized composition.

Hereinafter, the method for preparing a forward osmosis-based separation membrane based on a multilayer thin film, using crosslinking between organic monomers, according to an exemplary embodiment of the present disclosure and a forward osmosis-based separation membrane prepared thereby are described in detail referring to the attached drawings.

The method for preparing a forward osmosis-based separation membrane according to the present disclosure largely includes a <support preparation process>, a <middle layer preparation process> and a <selective layer preparation process>, in sequence.

Figure 1:
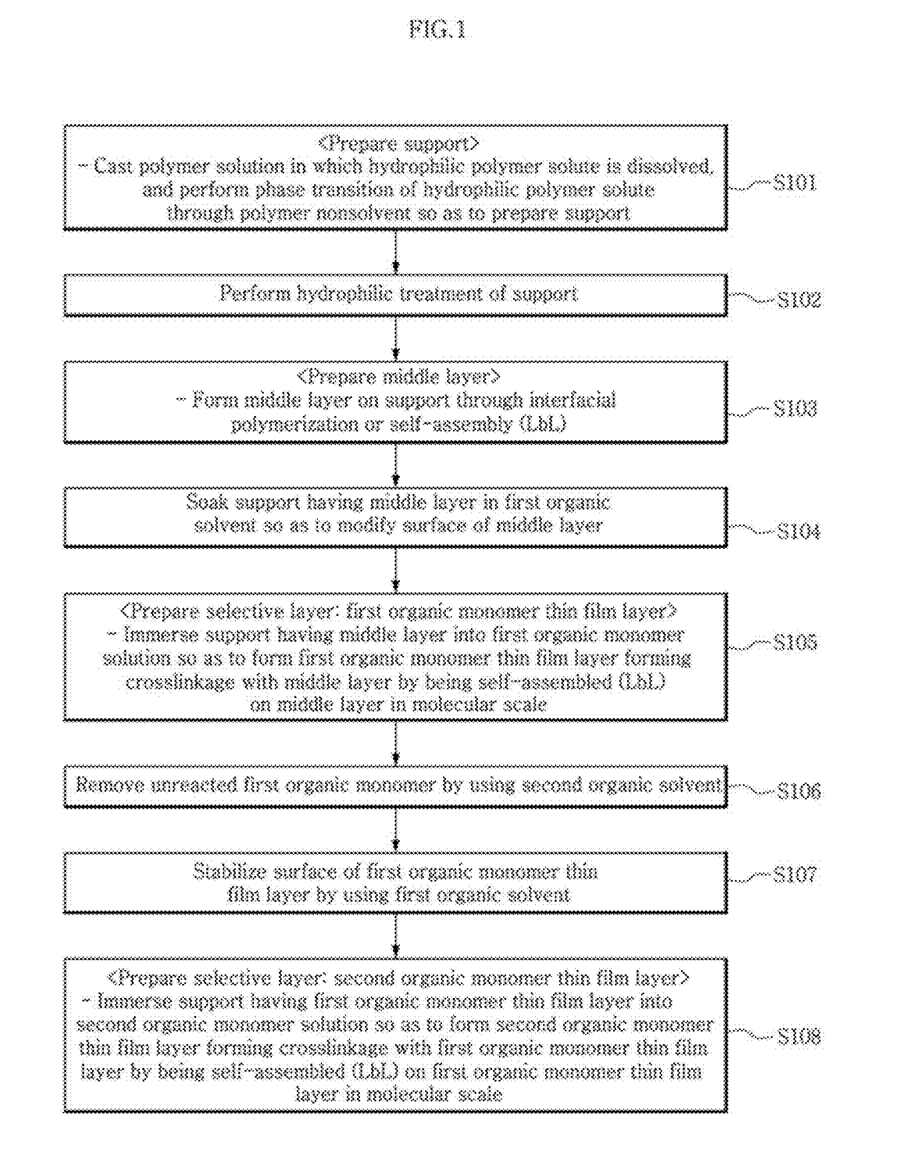
FIG. 1 is a flow chart for describing a method for preparing a forward osmosis-based separation membrane based on a multilayer thin film, using crosslinking between organic monomers, according to an exemplary embodiment of the present disclosure.
Figure 2:
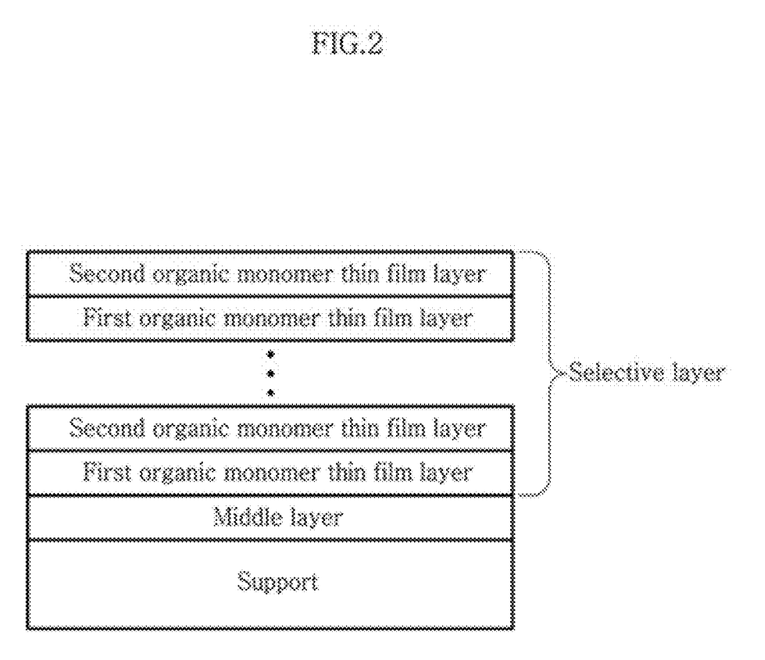
FIG. 2 is a schematic diagram of a forward osmosis-based separation membrane based on a multilayer thin film, using crosslinking between organic monomers, according to an exemplary embodiment of the present disclosure.

Referring to FIG. 1, the <support preparation process> proceeds as follows (S101). First, a polymer solution for preparing a hydrophilic porous support is prepared. The polymer solution is formed by dissolving a hydrophilic polymer solute in a polymer solvent. In the polymer solution, a pore-inducing agent is further mixed in addition to the hydrophilic polymer solute.

The hydrophilic polymer solute is a material which substantially constitutes the support and one of polyacrylonitrile (PAN), polyimide, polyetherimide and polyvinyl alcohol may be used. And, as the polymer solvent which dissolves the hydrophilic polymer solute, one of N-methylpyrrolidone (NMP), dimethylacetamide (DMAC) and dimethylformamide (DMF) may be used. In particular, when N-methylpyrrolidone (NMP) is used, relatively superior porosity and pore distortion properties may be achieved.

Figure 3A:
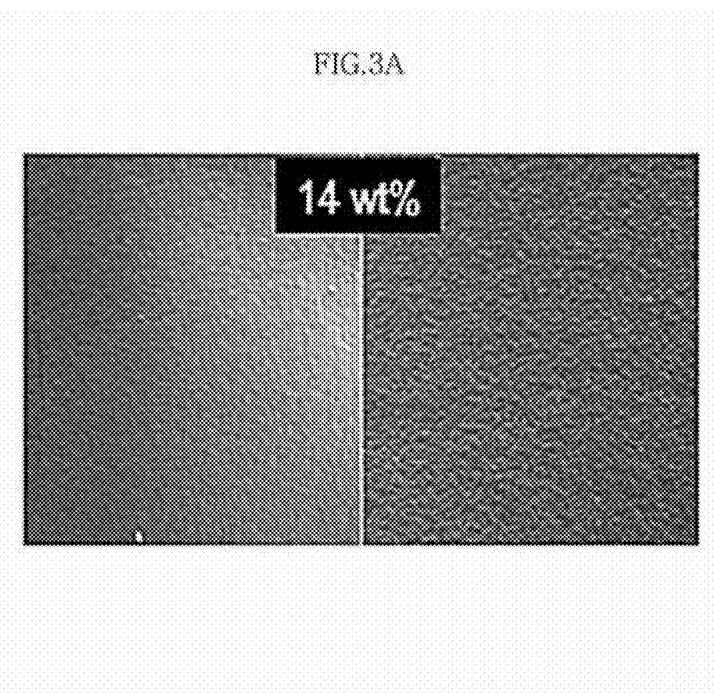
FIG. 3A and FIG. 3B are surface and cross-sectional SEM images of a support when polyacrylonitrile (PAN) is mixed at a concentration of 14 wt % as a hydrophilic polymer solute.
Figure 3B:
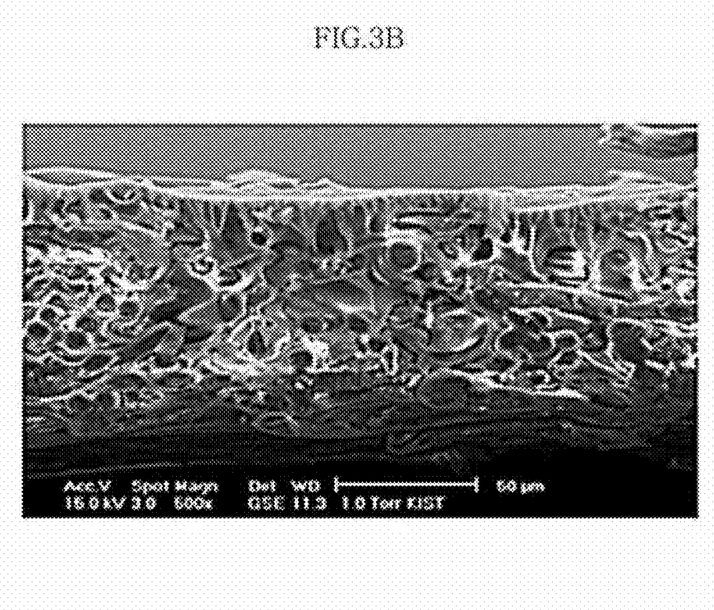
Figure 4A:
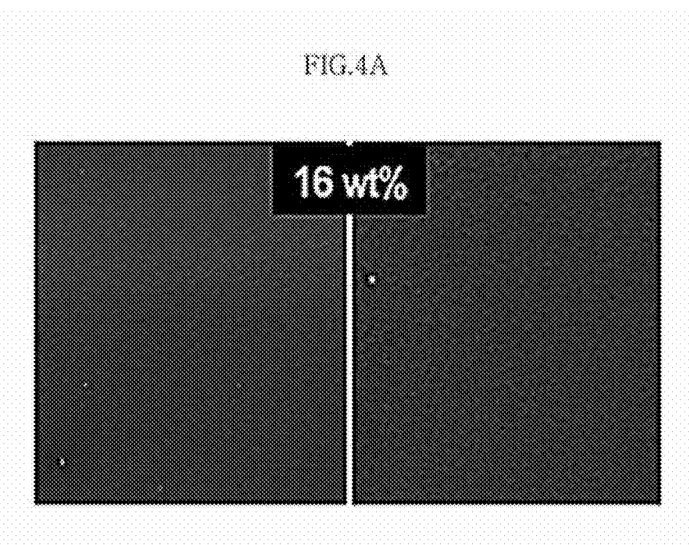
FIG. 4A and FIG. 4B are surface and cross-sectional SEM images of a support when polyacrylonitrile (PAN) is mixed at a concentration of 16 wt % as a hydrophilic polymer solute.
Figure 4B:
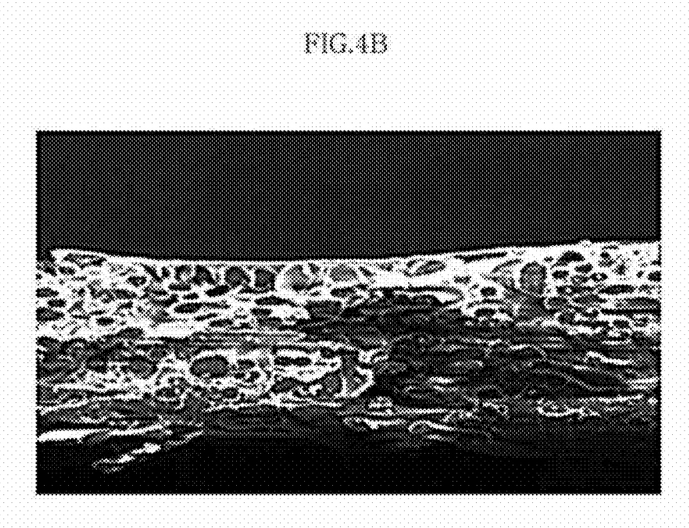

The hydrophilic polymer solute should be mixed and dissolved in the polymer solution at a concentration of 14-18 wt % to achieve a uniform surface pore size as well as high porosity and minimized pore distortion. If the concentration of the hydrophilic polymer solute is lower than 14 wt %, stable stacking of the selective layer is difficult because the pore size of the support becomes too large. And, if it is higher than 18 wt %, processability worsens because the viscosity of the polymer solution becomes too high. And, when the polymer solution is cast on a nonwoven fabric, if the concentration of the hydrophilic polymer solute is lower than 14 wt %, the PAN polymer may be filled into the pores of the nonwoven fabric before phase transition because the viscosity is too low. FIG. 3A and FIG. 3B are surface and cross-sectional SEM images of a support when polyacrylonitrile (PAN) is mixed at a concentration of 14 wt % as the hydrophilic polymer solute. FIG. 4A and FIG. 4B are surface and cross-sectional SEM images of a support when polyacrylonitrile (PAN) is mixed at a concentration of 16 wt % as the hydrophilic polymer solute. From FIGS. 3A, 3B, 4A and 4B, it can be seen that the surface pore size is uniform as 20 nm or smaller and the porosity is high.

The pore-inducing agent is a strongly volatile material and serves to form nano-sized pores in the hydrophilic polymer solute during volatilization. One of 1,3-dioxalane, polyvinylpyrrolidone and acetone or a combination thereof may be used as the pore-inducing agent. The mixing ratio of the pore-inducing agent may be controlled depending on the desired pore size. The pore size decreases as the mixing ratio of the pore-inducing agent increases. The pore-inducing agent is mixed in the polymer solution at a concentration of 1-5 wt %.

After the polymer solution is prepared, the polymer solution is cast on a nonwoven fabric or a glass substrate. As the nonwoven fabric, a polyester-based nonwoven fabric may be used. Also, a polyester-based woven fabric may be used instead of the nonwoven fabric. Then, when the nonwoven fabric or the glass substrate on which the polymer solution is cast is dipped into a polymer nonsolvent, the polymer solvent contained in the cast polymer solution is eluted into the polymer nonsolvent and the hydrophilic polymer solute is phase-transited to a solid state (phase inversion). As a result, a support is obtained. Water may be used as the polymer nonsolvent and the temperature of the polymer nonsolvent should be maintained at 15-30° C. during the phase transition of the polymer solute. When the temperature of the polymer nonsolvent is below 15° C., finger-type pores are formed in the support. And, when the temperature is above 30° C., sponge-type pores are formed in the support. For the support of a forward osmosis-based separation membrane, it is desired that the pores inside the support have a highly interconnected open pore structure so as to ensure high physical strength and low resistance properties. When the temperature of the polymer nonsolvent is controlled at 15-30° C., the pores inside the support have a highly interconnected open pore structure as the finger-type pores and the sponge-type pores are mixed adequately. For reference, a commercially available PAN support does not exhibit water flux property enough to be used for a forward osmosis process because it usually has a sponge-type pore structure and its thickness is as large as about 50 μm. In contrast, a support wherein finger-type pores and sponge-type pores are mixed adequately like the support of the present disclosure, more specifically a finger-like support wherein finger-type pores are dominant, exhibits superior water flux property and the support can be formed to have a relatively smaller thickness.

After the support is formed, the support may be hydrophilically treated to improve hydrophilicity (S102). Specifically, when the support is immersed in a 1-5 M aqueous sodium hydroxide (NaOH) solution, the hydrophilicity of the support is increased through hydrolysis. Instead of using the aqueous sodium hydroxide solution, UV and ozone may be irradiated to the surface of the support or the surface of the support may be treated with oxygen plasma to improve hydrophilicity.

The <middle layer preparation process> proceeds after the support preparation process is completed.

As described above, the middle layer is a polymer thin film layer which is provided on the support, thereby covering the pores of the support and providing a stacking space for the selective layer. It is formed through interfacial polymerization or self-assembly (LbL) between polymer electrolytes (S103).

When interfacial polymerization is used, a middle layer with high water permeability may be formed through interfacial polymerization between a multifunctional amine and a multifunctional chloride, specifically through interfacial polymerization between piperazinamine and trimesoyl chloride (TMC) or through interfacial polymerization between piperazinamine and an aliphatic trifuctional chloride.

When self-assembly (LbL) between polymer electrolytes is used, the middle layer is formed through self-assembly (LbL) between an anode polymer electrolyte and a cathode polymer electrolyte. As the anode polymer electrolyte, one of polyetherimide, polyethylenimine and poly(allylamine hydrochloride) may be used. And, poly(acrylic acid) may be used as the cathode polymer electrolyte. Also, it is desired that the anode polymer electrolyte or the cathode polymer electrolyte has a larger molecular size than the pores of the support so as to prevent the polymer electrolyte from being filled in the pores of the support.

The <selective layer preparation process> proceeds after the middle layer is formed on the support.

First, a first organic monomer solution wherein a first organic monomer is dissolved in a first organic solvent is prepared. Then, the support having the middle layer formed, which has been prepared through the <middle layer preparation process>, is dipped into the first organic monomer solution. In the first organic solvent, the first organic monomer is suspended in a nano-sized molecular scale and is self-assembled (mLbL) on the middle layer in a molecular scale, thereby forming chemical bonding with the middle layer. Through this process, a first organic monomer thin film layer is formed (S105). Before the support having the middle layer formed is dipped into the first organic monomer solution, the support having the middle layer formed may be sufficiently soaked with the first organic solvent to provide the same solvent environment as the first organic monomer solution, in order to increase the amount of the first organic monomer self-assembled on the middle layer and chemically bonded to the middle layer (S104).

The first organic monomer is an aromatic diamine. Specifically, one of m-, o- and p-phenylenediamine may be used. And, the first organic solvent is one which does not dissolve the support and the middle layer but dissolves the first organic monomer and a second organic monomer which is described later. One of toluene and tetrahydrofuran (THF) may be used as the first organic solvent.

After the first organic monomer thin film layer is formed on the middle layer, the surface of the first organic monomer thin film layer is washed and the unreacted first organic monomer which does not form crosslinkage is removed using a second organic solvent (S106). For this purpose, the second organic solvent should have high solubility for the first organic monomer. One of acetone, an alcohol, water and tetrahydrofuran (THF) may be used as the second organic solvent.

The first organic monomer has a relatively higher solubility in the second organic solvent than in the first organic solvent. Due to this solubility characteristic of the first organic monomer, washing in the second organic solvent is necessary. In contrast, because a second organic monomer which is described later has a sufficiently high solubility in the first organic solvent, washing in the second organic solvent is not necessary.

After washing of the first organic monomer thin film layer using the second organic solvent is completed, an additional washing process using the first organic solvent is required to maintain a uniform solvent environment (S107). That is to say, after the washing process using the second organic solvent, additional washing is performed by putting the support having the first organic monomer thin film layer formed in the first organic solvent. Through this, the first organic monomer thin film layer formation process is completed. For reference, the process of washing the surface of the first organic monomer thin film layer using the second organic solvent may be omitted. In this case, after the first organic monomer thin film layer has been formed, a washing process may be performed using the first organic solvent.

A second organic monomer thin film layer formation process after the first organic monomer thin film layer is formed (S108). Specifically, a second organic monomer solution wherein a second organic monomer is dissolved in the first organic solvent is prepared. Then, the support having the first organic monomer thin film layer formed is dipped into the second organic monomer solution. In the first organic solvent, the second organic monomer is suspended in a nano-sized molecular scale and is self-assembled (mLbL) on the first organic monomer thin film layer in a molecular scale, thereby forming chemical bonding with the first organic monomer thin film layer. Through this process, a second organic monomer thin film layer is formed. The second organic monomer is a multifunctional chloride. Specifically, trimesoyl chloride (TMC) may be used.

Then, the surface of the second organic monomer thin film layer is washed and the unreacted first organic monomer is removed using the first organic solvent. Through this, the second organic monomer thin film layer formation process is completed.

By repeating the first organic monomer thin film layer formation process and the second organic monomer thin film layer formation process described above, a selective layer wherein the first organic monomer thin film layer and the second organic monomer thin film layer are stacked alternately and repeatedly may be formed and the thickness of the selective layer may be controlled with the number of the first organic monomer thin film layer formation process and the second organic monomer thin film layer formation process.

Specifically, the first organic monomer thin film layer or the second organic monomer thin film layer is formed with a thickness of 0.1-3 nm, and the first organic monomer or the second organic monomer which is self-assembled and forms the first organic monomer thin film layer or the second organic monomer thin film layer may have a molecular size of 1 nm or smaller.

MODE FOR INVENTION

Next, the characteristics of a forward osmosis-based separation membrane based on a multilayer thin film, using crosslinking between organic monomers, according to the present disclosure are investigated through test examples.

Test Example 1: Preparation of Forward Osmosis-Based Separation Membrane of the Present Disclosure Polyacrylonitrile (PAN) was mixed with N-methylpyrrolidone (NMP) as a polymer solvent at a concentration of 16 wt % and then cast on a polyester-based nonwoven fabric to a thickness of 25 μm. Then, a support was prepared by performing phase transition of the polyacrylonitrile (PAN) by immersing the glass substrate in water. Then, the hydrophilicity of the support was improved by dipping the support into 2 M NaOH at 45° C. for 1 hour.

After mixing a 1 wt % polyethylenimine aqueous solution and a 1 wt % poly(acrylic acid) aqueous solution, a middle layer was formed through self-assembly between the polyethylenimine and poly(acrylic acid) polymer electrolytes by dipping the support into the mixed aqueous solution for 3 minutes.

A first organic monomer solution in which 1 wt % m-phenylenediamine was dissolved and a second organic monomer solution in which 1 wt % trimesoyl chloride (TMC) was dissolved were prepared by using m-phenylenediamine as a first organic monomer, trimesoyl chloride (TMC) as a second organic monomer, toluene as a first organic solvent and acetone as a second organic solvent.

After forming a first organic monomer thin film layer by dipping the support having the middle layer formed into the first organic monomer solution, the support was washed sequentially with the second organic solvent and the first organic solvent. Then, after forming a second organic monomer thin film layer by dipping the support having the first organic monomer thin film layer formed into the second organic monomer solution, the support was washed using the first organic solvent. A selective layer was formed by performing this procedure 0-10 times.

Test Example 2: Preparation of Forward Osmosis-Based Separation Membrane Through Interfacial Polymerization HTI's CTA support was prepared. Also, a 2 wt % m-phenylenediamine aqueous solution (MPD aqueous solution) and a 0.05 wt % trimesoyl chloride (TMC) solution in hexane (TMC solution) were prepared. After pouring the MPD aqueous solution onto the surface of the support, the support was pressed with a rubber roller 3 minutes later and then the remaining MPD aqueous solution was removed. Then, after pouring the TMC solution, an interfacially polymerized separation membrane was prepared by washing with water 1 minute later.

Test Example 3: Test of Forward Osmosis Separation Performance

Forward osmosis separation performance was tested for the forward osmosis-based separation membrane of the present disclosure prepared in Test Example 1 (mLbL), the forward osmosis-based separation membrane prepared in Test Example 2 (IP) and HTI's commercially available CTA forward osmosis membrane (HTI). 0.5 M NaCl was used as an inducing solution and ultrapure water was used as a feed solution. Pressure was set to 0.2 bar and flow rate was set to 0.6 L/min.

As seen from Table 1 below, the mLbL separation membrane of the present disclosure showed superior water flux and salt flux properties as compared to the commercially available separation membrane (HTI) and the separation membrane having the interfacially polymerized (IP) selective layer. Also, it was confirmed that the forward osmosis performance was improved as the number of mLbL stacking increased (from 0 to 5 to 10), with water flux increasing and salt flux decreasing.

TABLE 1

Result of forward osmosis separation performance test

| | Water flux (L/m$^2$ · h) | Salt flux (mmol/m$^2$ · h) |
|---|---|---|
| HTI | 9.26 | 259 |
| IP | 9.47 | 35.6 |
| mLbL(0) | 11.39 | 17.2 |
| mLbL(5) | 16.81 | 1.75 |
| mLbL(10) | 28.19 | 0.58 |

What is claimed is:

1. A forward osmosis-based separation membrane based on a multilayer thin film, using crosslinking between organic monomers, which comprises:
   a support comprising a hydrophilic polymer material;
   a middle layer in the form of a polymer thin film layer which is provided on the support and blocks pores of the support;
   a first organic monomer thin film layer which is self-assembled (mLbL) on the middle layer in a molecular scale and forms chemical bonding with the middle layer; and
   a second organic monomer thin film layer which is self-assembled (mLbL) on the first organic monomer thin film layer in a molecular scale and forms crosslinkage with the first organic monomer thin film layer.

2. The forward osmosis-based separation membrane based on a multilayer thin film, using crosslinking between organic monomers, according to claim 1, wherein the support has a structure wherein the hydrophilic polymer material is provided in a nonwoven fabric or a woven fabric.

3. The forward osmosis-based separation membrane based on a multilayer thin film, using crosslinking between organic monomers, according to claim 1, wherein the middle layer is formed through interfacial polymerization between a multifunctional amine and a multifunctional chloride.

4. The forward osmosis-based separation membrane based on a multilayer thin film, using crosslinking between organic monomers, according to claim 1, wherein the middle layer is formed through interfacial polymerization between piperazinamine and trimesoyl chloride (TMC) or interfacial polymerization between piperazinamine and an aliphatic trifuctional chloride.

5. The forward osmosis-based separation membrane based on a multilayer thin film, using crosslinking between organic monomers, according to claim 1, wherein the middle layer is formed through self-assembly (LbL) between an anode polymer electrolyte and a cathode polymer electrolyte, the anode polymer electrolyte is one of polyetherimide, polyethylenimine and poly(allylamine hydrochloride) and the cathode polymer electrolyte is poly(acrylic acid).

6. The forward osmosis-based separation membrane based on a multilayer thin film, using crosslinking between organic monomers, according to claim 1, wherein a first organic monomer of the first organic monomer thin film layer is an aromatic diamine.

7. The forward osmosis-based separation membrane based on a multilayer thin film, using crosslinking between organic monomers, according to claim 1, wherein a first organic monomer of the first organic monomer thin film layer is one of m-, o- and p-phenylenediamine.

8. The forward osmosis-based separation membrane based on a multilayer thin film, using crosslinking between organic monomers, according to claim 1, wherein a second organic monomer of the second organic monomer thin film layer is a multifunctional chloride.

9. The forward osmosis-based separation membrane based on a multilayer thin film, using crosslinking between organic monomers, according to claim 1, wherein a second organic monomer of the second organic monomer thin film layer is trimesoyl chloride (TMC).

10. A method for preparing a forward osmosis-based separation membrane based on a multilayer thin film, using crosslinking between organic monomers, which comprises:
    a step of forming a support by dipping a polymer solution in which a hydrophilic polymer solute is dissolved into a polymer nonsolvent, thereby performing phase transition of the hydrophilic polymer solute;
    a step of forming a middle layer on the support;
    a step of forming a first organic monomer thin film layer which is self-assembled on the middle layer in a molecular scale and forms chemical bonding with the middle layer by preparing a first organic monomer solution in which a first organic monomer is dissolved and dipping the support having the middle layer formed into the first organic monomer solution; and
    a step of forming a second organic monomer thin film layer which is self-assembled on the first organic monomer thin film layer in a molecular scale and forms crosslinkage with the first organic monomer thin film layer by preparing a second organic monomer solution in which a second organic monomer is dissolved and dipping the support having the first organic monomer thin film layer formed into the second organic monomer solution.

11. The method for preparing a forward osmosis-based separation membrane based on a multilayer thin film, using crosslinking between organic monomers, according to claim 10, wherein the polymer solution in which the hydrophilic polymer solute is dissolved is a polymer solution in which the hydrophilic polymer solute is dissolved in a polymer solvent and the hydrophilic polymer solute is one of polyacrylonitrile (PAN), polyimide, polyetherimide and polyvinyl alcohol.

12. The method for preparing a forward osmosis-based separation membrane based on a multilayer thin film, using crosslinking between organic monomers, according to claim 10, wherein the polymer solvent is one of N-methylpyrrolidone (NMP), dimethylacetamide (DMAC) and dimethylformamide (DMF).

13. The method for preparing a forward osmosis-based separation membrane based on a multilayer thin film, using crosslinking between organic monomers, according to claim 10, wherein the hydrophilic polymer solute is mixed in the polymer solution at a concentration of 14-18 wt %.

14. The method for preparing a forward osmosis-based separation membrane based on a multilayer thin film, using crosslinking between organic monomers, according to claim 10, wherein the step of forming the support comprises:
    a step of preparing a polymer solution in which a hydrophilic polymer solute is dissolved;
    a step of casting the polymer solution; and
    a step of forming the support by dipping the cast polymer solution into a polymer nonsolvent, thereby eluting a polymer solvent comprised in the cast polymer solution and performing phase transition of the hydrophilic polymer solute to a solid, and the polymer solution is cast on one of a nonwoven fabric, a glass substrate or a woven fabric.

15. The method for preparing a forward osmosis-based separation membrane based on a multilayer thin film, using crosslinking between organic monomers, according to claim 10, wherein, before the formation of the middle layer, the support is put in an aqueous sodium hydroxide (NaOH) solution so as to induce hydrolysis.

16. The method for preparing a forward osmosis-based separation membrane based on a multilayer thin film, using crosslinking between organic monomers, according to claim 10, wherein, before the formation of the middle layer, UV and ozone are irradiated to the surface of the support or the surface of the support is treated with oxygen plasma.

17. The method for preparing a forward osmosis-based separation membrane based on a multilayer thin film, using crosslinking between organic monomers, according to claim 10, wherein the middle layer is formed through interfacial polymerization or self-assembly.

18. The method for preparing a forward osmosis-based separation membrane based on a multilayer thin film, using crosslinking between organic monomers, according to claim 10, wherein the middle layer is formed through self-assembly (LbL) between an anode polymer electrolyte and a cathode polymer electrolyte and the anode polymer electrolyte and the cathode polymer electrolyte have a larger molecular size than pores of the support.

19. The method for preparing a forward osmosis-based separation membrane based on a multilayer thin film, using crosslinking between organic monomers, according to claim 10, wherein the first organic monomer solution is one in which the first organic monomer is dissolved in a first organic solvent and the second organic monomer solution is one in which the second organic monomer is dissolved in a first organic solvent.

20. The method for preparing a forward osmosis-based separation membrane based on a multilayer thin film, using crosslinking between organic monomers, according to claim 19, wherein the first organic solvent does not dissolve the support and the middle layer but dissolves the first organic monomer and the second organic monomer.

* * * * *